United States Patent [19]

Nanboku et al.

[11] Patent Number: 5,712,630
[45] Date of Patent: Jan. 27, 1998

[54] HIGH POWER MOVING OBJECT IDENTIFICATION SYSTEM

[75] Inventors: Masato Nanboku, Hirakata; Toshiaki Yoshiyasu, Katano; Koji Oono, Neyagawa; Takashi Saeki, Kirakata; Takayuki Nii, Toyonaka; Atsushi Misawa, Kadoma; Masahiro Nagata, Higashiosaka; Yasunori Kasho, Katano, all of Japan

[73] Assignee: Matsushita Electric Works, Ltd., Osaka, Japan

[21] Appl. No.: 506,196

[22] Filed: Jul. 24, 1995

[30] Foreign Application Priority Data

| Jul. 26, 1994 | [JP] | Japan | 6-174113 |
| Feb. 23, 1995 | [JP] | Japan | 7-035104 |
| Apr. 11, 1995 | [JP] | Japan | 7-085787 |

[51] Int. Cl.$^6$ ........................ H04B 7/00
[52] U.S. Cl. .............. 340/825.54; 342/42; 342/44; 342/51; 342/50; 340/825.69; 340/825.77; 340/825.53
[58] Field of Search ................ 342/42, 44, 50, 342/51; 340/825.54, 825.34, 825.69, 825.77, 825.53; 235/375

[56] References Cited

U.S. PATENT DOCUMENTS

| 5,030,807 | 7/1991 | Landt et al. | 235/375 |
| 5,053,774 | 10/1991 | Schuermann et al. | 342/44 |
| 5,055,659 | 10/1991 | Hendrick et al. | 342/44 X |
| 5,144,314 | 9/1992 | Malmberg et al. | 342/44 |
| 5,196,846 | 3/1993 | Brockelsby et al. | 340/825.54 X |
| 5,451,958 | 9/1995 | Schuermann | 342/42 |
| 5,525,991 | 6/1996 | Nagura et al. | 342/42 |
| 5,548,291 | 8/1996 | Meier et al. | 342/44 X |

FOREIGN PATENT DOCUMENTS

| 0 346 922 A2 | 6/1989 | European Pat. Off. |
| 0 596 521 A2 | 5/1994 | European Pat. Off. |
| 1-290336 | 11/1989 | Japan |
| 1-290337 | 11/1989 | Japan |

*Primary Examiner*—Michael Horabik
*Assistant Examiner*—William H. Wilson, Jr.
*Attorney, Agent, or Firm*—Nikaido, Marmelstein, Murray & Oram LLP

[57] ABSTRACT

A moving object identification system with a novel coding scheme achieves 75% transmission efficiency. With this system, a transmittable range is expanded. Logical value assignment for residual resonant oscillations in a residual resonant signal is performed by comparing a residual frequency with a threshold frequency. A wave energy reduction of an ASK modulated signal is used to decrease the energy of the signal in order to distinguish similar residual frequencies in the case of extremely close communication. Reliability of Write/Read instructions in this system is improved by employing a test writing before an actual writing and a voltage monitoring device.

12 Claims, 10 Drawing Sheets

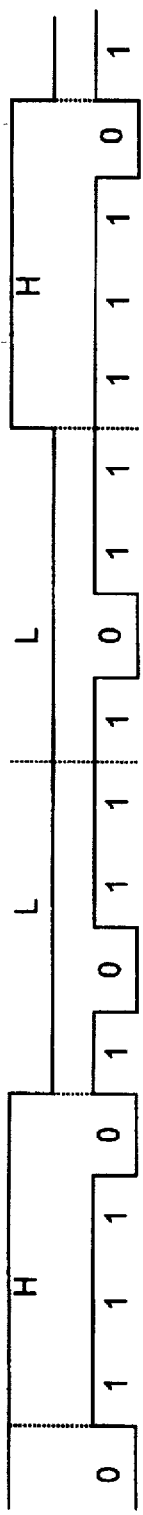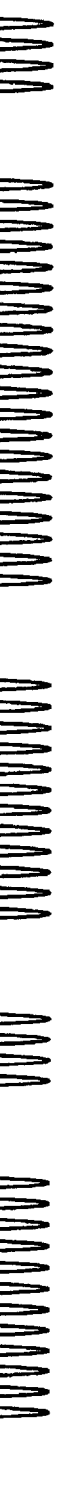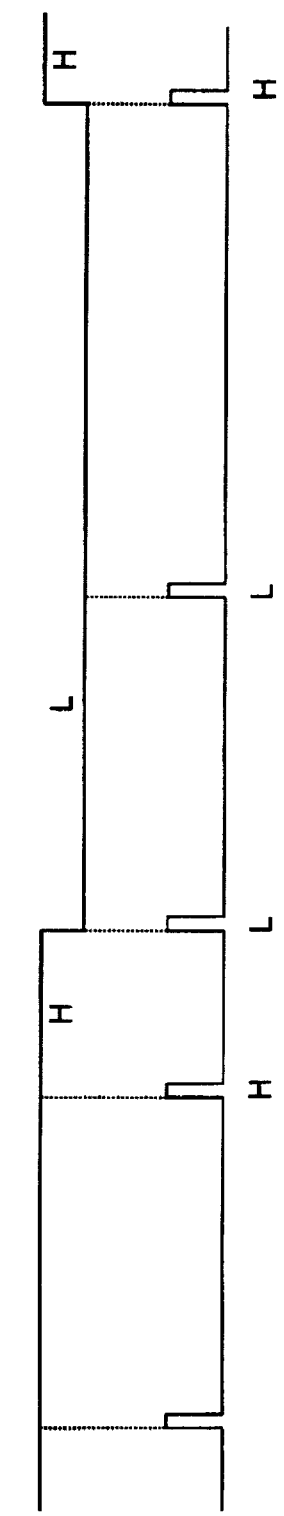
FIG. 3A
FIG. 3B
FIG. 3C
FIG. 3D
FIG. 3E
FIG. 3F
FIG. 3G
FIG. 3H

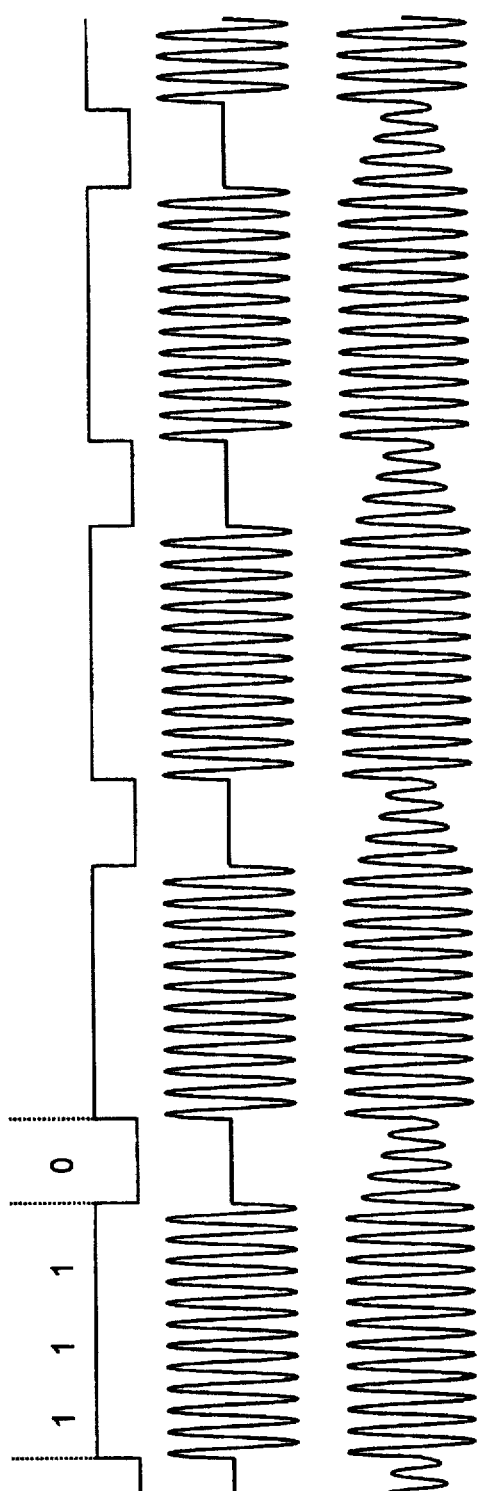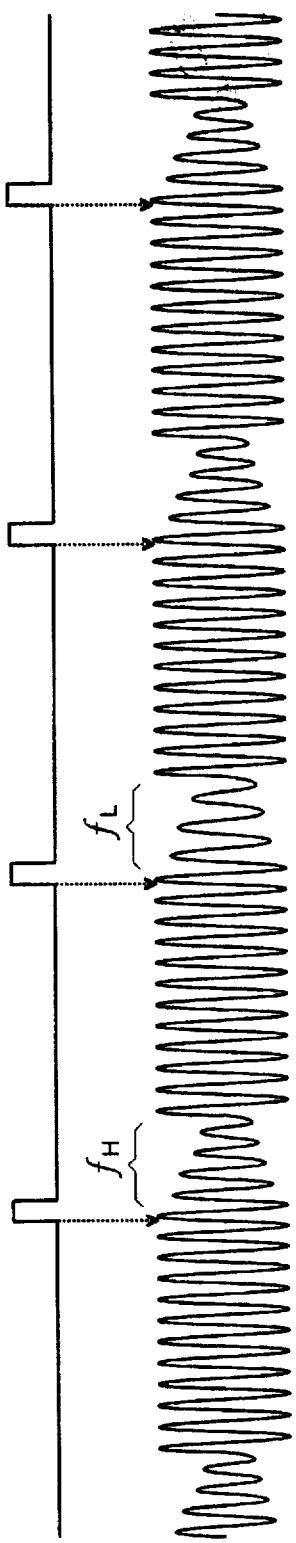
FIG. 4A
FIG. 4B
FIG. 4C
FIG. 4D
FIG. 4E
FIG. 4F
FIG. 4G

5,712,630

HIGH POWER MOVING OBJECT IDENTIFICATION SYSTEM

FIELD OF THE INVENTION

The present invention relates to development of a high power moving object identification system (HPMOIS), comprising a host computer, a controller, an interrogator, and a transponder furnished on a moving object, which is capable of writing data on or reading the data from the transponder in an expanded transmittable range. More specifically, the invention relates to improvement on analysis of a residual resonant signal from the transponder in a case of close communication between the interrogator and the transponder, and employment of a test writing task before an actual writing on the transponder and a device monitoring a voltage level of the transponder for reliable reading and writing processes by the HPMOIS in that range.

BACKGROUND OF THE INVENTION

A number of moving object identifying systems (MOIS) is used in various fields of industries and government institutions. For example, an MOIS is employed in manufacturing assembly lines. In this case, an interrogator transmits a write command including date, product number, and the like as a transmission signal. Then the signal is received by a transponder equipped on a product, say a personal computer, moving on a conveyer of the assembly lines. According to the command, the data is stored in a memory of the transponder. Then the data is read from the memory by a protocol analysis unit of the transponder and sent to the interrogator to control the manufacture of the product including defect-finding, packaging, and shipping processes. Similar technology in the MOIS is used for anti-theft systems for automobiles. In these systems, a transponder built in a car key sends a signal with special codes to an interrogator of a security system in an automobile. If a car thief opens a door of the automobile without the key, the system shuts down ignition, disables fuel injection, and disarms engine electronics. Furthermore, the technology is used even for pigs which a transponder is injected to record their medical history and weights at sale and at slaughter.

The prior art, disclosed in Japanese Patent Publications (KOKAI) 1-290336 and 1-290337, describes such moving object identifying devices mentioned above, in featuring communication between an interrogator linked with the controller and the host computer and a transponder remotely separated from the interrogator with some distance.

Moving object identifying devices in the prior art have an interrogator that sends a carrier wave having duty ratios 70% for logical value "1" and 30% for logical value "0". Often one of the logic values dominates the other to cause unstable transmission power; therefore, a Manchester coded signal is used in order to obtain stable power.

However, these devices generate only 50% of transmission power per unit time due to the Manchester coding. If the expansion of the transmittable range is desired, it is extremely difficult for the Manchester coded devices to make the expansion possible. And the devices are sensitive to noise created in a resonant circuit since they result in the ratio difference of only 40% (70%–30%).

Considering a writing mode of the Manchester coding devices, a carrier wave generated at the interrogator is pulse length modulated, the wave is amplitude shift keying (ASK) modulated. The resulting signal is transmitted to the transponder. The transponder has a resonant circuit equipped with an antenna coil. After the signal sent by the interrogator, an inductive voltage generated at the resonant circuit is used as a power source unit for the transponder. The power source unit has a smoothing capacitor, and the current in the unit is rectified. The wave is demodulated and send to a protocol analysis unit. This unit translates a signal of the wave into a writing command and writes data in the memory according to the command.

Nevertheless, it is necessary to use a booster for the writing which consumes more electricity than for the reading. When the transponder is separated with large distance, a voltage in the power source of the transponder decreases often below a necessary voltage for the writing, due to insufficient transmission power, resulting in that data about written in the memory is erased.

Considering a reading mode of the Manchester coding devices, the interrogator sends a reading command to the transponder. The data written in the transponder is read by the protocol analysis unit according to the command. Based on the data, the presence or absence of a residual resonant oscillation is generated in each null period of a reference signal at the resonance circuit of the transponder. The resulting signal as a residual resonant signal is transmitted back to the interrogator. The residual resonant signal is received by a resonant circuit in the interrogator where the presence and absence time intervals are faithfully regenerated. Then this signal is ASK demodulated, and the demodulated signal is further translated in order to interpret the data.

If the difference between the ratios is increased for larger transmission power with the Manchester coding, residual resonant oscillations are always present in the null periods. Thus even if the expansion of the transmission range were possible with the Manchester coding, it is extremely difficult to detect which logic value is assigned in each null period of the residual resonant signal. Moreover, after the writing has failed due to the insufficient voltage, the transponder reads incorrect data according to the reading command sent by the interrogator.

Therefore, there is a strong need for a moving object identifying device having more transmission power in order to perform writing and reading data in the memory with less errors, to differentiate cleanly residual resonant oscillations in a residual resonant signal, and to expand a transmitting range.

SUMMARY OF THE INVENTION

A main object of the present invention relates to expansion of the transmittable range of an MOIS. The feature of the invention is based on a coding scheme in which transmission efficiency of 75% is possible. Making this efficiency possible, the invention employs a novel translation (or coding) of transmission data expressed in terms of two logical levels "H" (high) and "L" (low) into a coded signal in terms of a series of binary digits "1" and "0". In this translation, the logical levels "H" and "L", as elements of the transmission data, are translated explicitly in terms of various four-figure binary series having only one three "1"s and "0". Thus, the employment of the four-figure binary series enables the transmission efficiency of 75%. Orders of these four-figure binary series are crucial in this invention. A coding system of the present invention uses three different information: a "1", three "1"s, and five "1"s, the number of "1"s between two "0"s in the coded signal. And the series must start or end with "1" in order to eliminate "00" sequences, being out of the scheme, from all possible combinations of these four-figure binary series.

An HPMOIS with the high power coding scheme comprises a controller linked with a host computer, an interrogator linked with the controller, and a transponder separated from the two. The interrogator has transmission and reception coils whereas the transponder has a transmission-reception coil. Communication by radio frequency between the interrogator and the transponder is performed by which a radio frequency (RF) wave indicative of transmission data is transmitted from the transmission coil through the transmission-reception coil to the reception coil. The transponder is, therefore, placed distantly from the interrogator such that these coils connected by electromagnetic induction are capable of operating the communication (i.e., the coils of the interrogator are coupled by transformer coupling to the coil of the transponder so that communication at a radio frequency is carried out through this coil coupling or transformer coupling). Nevertheless, the transponder depends on solely transmission power from the interrogator.

The controller sends initially transmission data (SD) from the host computer to the interrogator for executions of desired tasks. The interrogator has two communication channels: transmission and reception channels. For the transmission channel, the interrogator sends the transmission data (SD), including write, read, check commands and etc., to the transponder. For the reception channel, the transponder sends replied data to the reading command back to the interrogator. The controller sends a switching signal (SS) to the interrogator that alters the communication channels. In addition to these data and signals, the controller sends a system clock signal (SC) to the interrogator.

For communication through the transmission channel, first, transmission data is translated into a coded signal by the high power coding scheme. Second, the coded signal is modulated by an ASK modulator and the modulated signal is transmitted by the interrogator. Third, the transponder receives the signal and performs translation the signal back into the coded signal and, later, eventually the transmission data. Fourth, the data is stored for being read in a memory by a memory controller.

On the other hand, for communication through the reception channel, first, an answering frame with a known, regular pattern such as "HHHH", is translated into a coded signal of "1110111011101110". Second, the coded signal is ASK modulated and transmitted by the interrogator. Third the transponder received the signal and translated into a decoded signal. A memory controller reads data expressed in terms the logic value "1" or "0" stored in the memory, assign elements of the read data on "0" positions of the answering frame. The data elements assigned in the answering frame are forwarded to a reception control unit. Based on these data elements, the reception control unit generates residual resonant oscillations, depending on types of the logic values, in the positions of "0" in the answering frame.

Thus, the present invention provides an accurate logic value assignment for the residual oscillations in the answering frame, instead of the logic value assignment of the residual resonant signal by the presence or absence of residual oscillations employed in the prior art.

Moreover, in close communication, magnetic coupling between inductors in the interrogator and the transponder often causes a shift of frequencies fH and fL. Thus, the present invention determines fH for a test transmission and the frequency difference between fH and fL is known. A threshold frequency $f_{th}$, therefore, is exactly the difference (absolute value) between fH and half of the frequency difference. Even if the frequencies are shifted, the threshold frequency also shifts according to the shift of the frequencies fH and fL. Thus the logical assignment by using the threshold frequency is technically independent on the effect of the magnetic coupling. The logical value assignment is done by following a rule: if a resonant frequency is less than $f_{th}$, then the frequency is fL, and if a resonant frequency is greater than $f_{th}$, then the frequency is fH.

A further object of the present invention is to improve the reliability of the logical assignment by using the threshold frequency $f_{th}$ for even closer communication such that an envelope generator is unable to generate a signal because of residual oscillations having high energy. So the present invention equips a level decider storing an threshold energy level in which a signal at the envelope generator is obtainable. If a residual resonant signal has energy greater than the level, then the number of pulses in an ASK modulated signal is reduced. By this reduction, the residual decay starts early such that the oscillations are well defined. The wave energy reduction can be done one by one or at once.

Another further object of the present invention is to improve particularly in writing data in the memory by employing a test writing an address in the memory. The memory controller has a voltage monitoring device that checks whether the transponder has a sufficient voltage to perform the writing and reading instructions. A protocol analysis unit reports the interrogator responses for the voltage condition in each procedures of the writing instruction. The interrogator checks the reports and orders the transponder to perform a further procedure of the writing instruction if there is a sufficient voltage in the transponder. In doing this, it is avoided the situation which the transponder is located in such distance that only a reading instruction is possible.

Moreover, the reports for the voltage condition by the protocol analysis unit of the transponder are replaced by a single wake-up call from the interrogator. In the case of an insufficient voltage, the unit stops the writing instruction immediately and waits for the call. Therefore, numerous responses and checks by the transponder and the interrogator for the voltage condition are avoided.

Finally, since the life time of the memory is limited only about 10,000 writing, the present invention provides possible ways to prolong the life time of the memory by using a blank writing, that is an only consumption of the same current for the dummy writing, and a dummy writing on a RAM before writing actually in the memory.

BRIEF DESCRIPTION OF THE DRAWINGS

FIGS. 3A through H show signal conversions in transmission communication between the interrogator and the transponder started by transmission data;

FIGS. 4A through G show signal conversions in reception communication between the interrogator and the transponder started by an answering frame;

DETAILED DESCRIPTION OF PREFERRED EMBODIMENTS (Embodiment 1)

Figure 1:
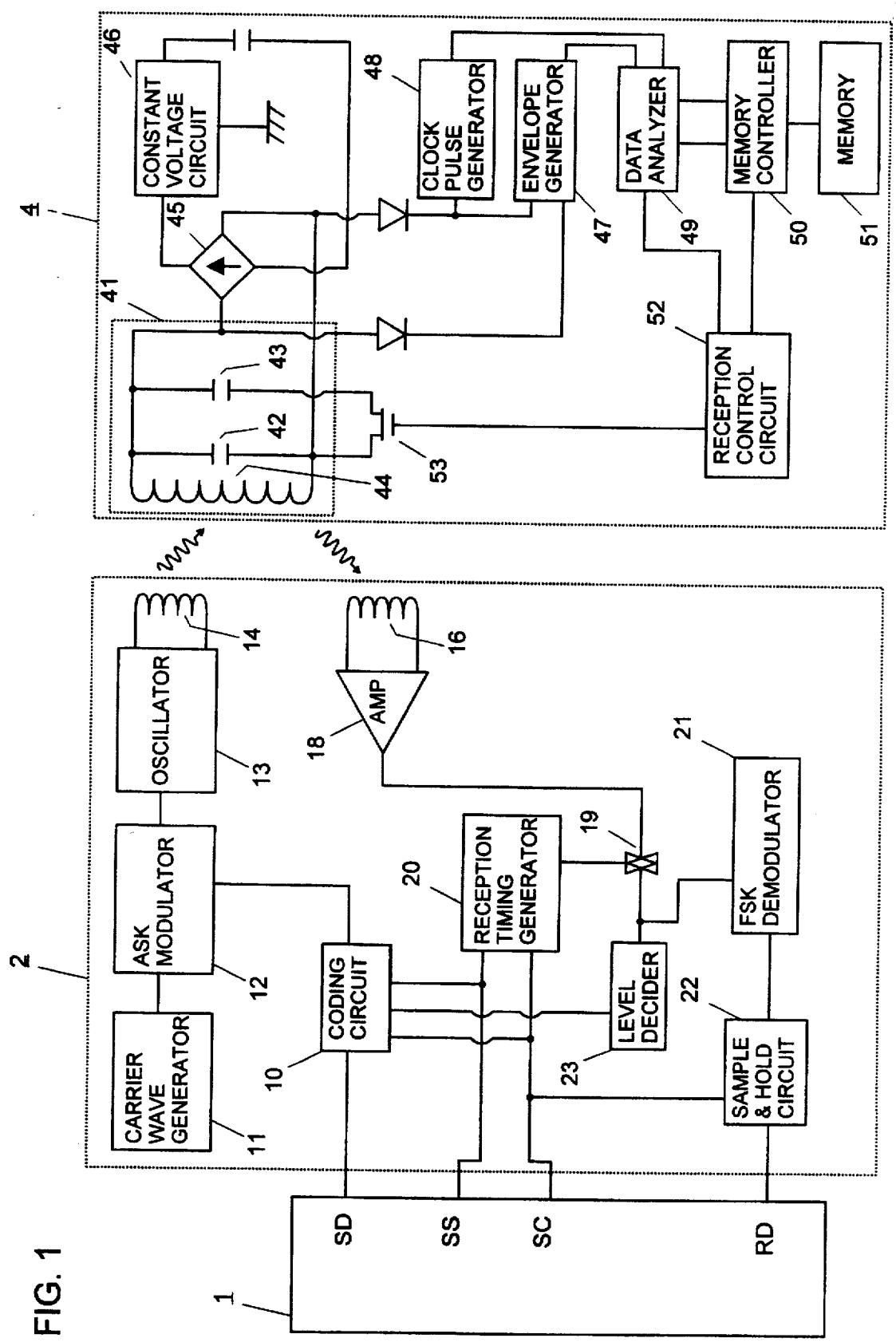
FIG. 1 shows a simple electronic circuit diagram of an HPMOIS comprising a controller, an interrogator, and a transponder.

Referring now to FIG. 1, this figure illustrates a schematic circuit diagram of an interrogator (2) having a transmission unit and a reception unit, a transponder (4), and a controller (1) of the HPMOIS used in the present embodiment. A host computer is not shown in this figure.

The transmission unit of the interrogator (2) comprises a coding circuit (10) for translating transmission data (SD) into a coded signal, a carrier wave generator (11), an amplitude shift keying (hereinafter ASK) modulator (12) for modulating the coded signal with the generator (11), an oscillator (13), and an inductor (14) for transmitting the ASK modulated signal to the transponder (4).

The reception unit of the interrogator (2) comprises an inductor (16) to receive a residual resonant signal from the transponder (4), an amplifier (18), an frequency shift keying (hereinafter FSK) demodulator (21) for demodulating the residual resonant signal into another coded signal, a reception timing generator (20) for functioning only during a reception mode, a sample-and-hold circuit (22) for translating the coded signal into reception data (RD) for the controller (1), and a level decider (23) (discussed later).

There is a switch (19), administrated by the reception timing generator (20), that changes the transmission and reception units back and forth.

The transponder (4) has a resonant circuit (41) comprising an inductor (44) for transmission-reception, two capacitors (42) and (43) connected with the inductor (44) for generating two distinct resonant frequencies, a diode bridge (45), a constant voltage circuit (46) for storing a power source of the transponder (4), an envelope generator (47), a clock pulse generator (48), a data analyzer (49) for analyzing outputs from the clock pulse generator (48) and the envelope generator (47), a memory controller (50) for completing decoding of transmission data (SD), a memory (51), and a reception control circuit (52) for generating a residual resonant signal.

The controller (1) sends a switching signal (SS) from the host computer to the interrogator (2) in terms of "H" and "L", determining whether the interrogator (2) is in a rest mode, a transmission mode, or a reception mode. During the resting mode, the controller (1) sends no data to the interrogator (2). During the transmission mode, the controller (1) sends transmission data (SD) to the transponder (4); in addition to the data, a system clock (SC) is sent to the interrogator (2). During the reception mode, the controller (1) sends an answering frame to the transponder (4) through the interrogator (2) and the transponder (4) sends a replied signal for the answering data, a residual resonant signal, back to the interrogator (2).

Figures 2A, 2B, 2C, 2D:
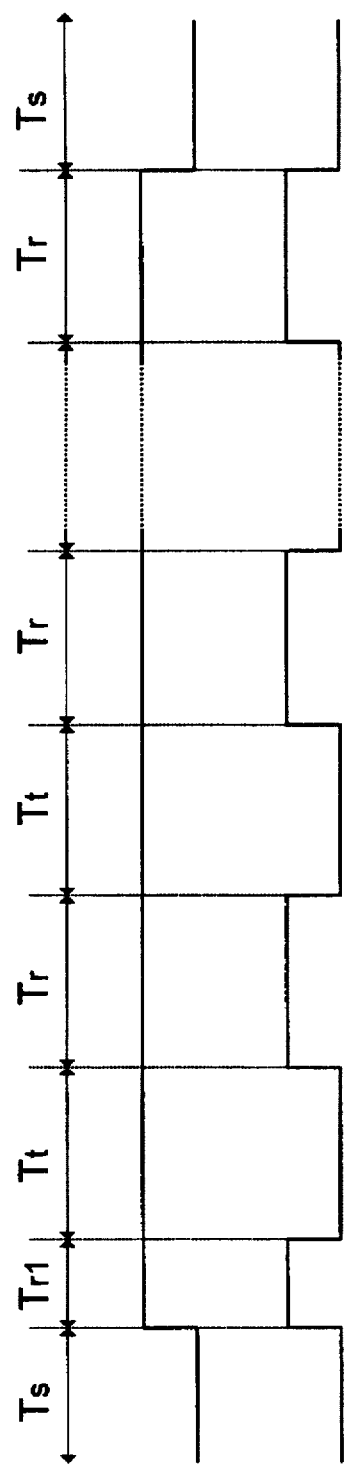
FIGS. 2A through D show an example for generating a switching signal and transmission and reception signals.

FIGS. 2A through D describe a technique on generating switching signals (SS). The controller (1) inputs the reception timing generator (20) two types of switching signal sources, TXC shown in FIG. 2A and RXC shown in FIG. 2B. When both TXC and RXC are "L", the switching signal is defined as time for the rest mode denoted as Ts. When both TXC and RXC are "H", the switching signal is defined as time for the reception mode denoted as Tr. The first reception mode Tr1 is used to determine a threshold frequency (discussed later). When TXC is "H" and RXC is "L", the switching signal is defined as time for the transmission mode denoted as Tt. In this mode, the reception timing generator (20) turns off the switch (19). FIGS. 2C and D show alternating transmission and reception modes, respectively. The following table summarizes the time settings explained above.

TABLE I

|    | TXC | RXC |
|----|-----|-----|
| Ts | L   | L   |
| Tt | H   | L   |
| Tr | H   | H   |

Transmission data (SD) is expressed by a sequence of "H" (high) or "L" (low) in this embodiment. These logical levels are translated (or coded) into a series of binary digits "1" and "0". In general, the number of one binary digit is greater than the number of the other, and a series comprises only one "0" and more than two "1"s. In particular, a preferred series can be any one of four-figure series: "1011", "1101", "1110", and "0111". The following table shows some of two-element transmission data (SD), their translated codes, and the number of "1"s between two "0"s.

TABLE I

| Transmission data (SD) | Coded data | Number of "1"s between two "0"s |
|---|---|---|
| HL | 0111 1011 | 4 |
| HL | 1011 0111 | 2 |
| HL | 1110 0111 | 0 |

As "H" is set to a four-figure series of "1110" and "L" is another four-figure series of "1011" in this embodiment, all possible combinations of coded data are shown in TABLE II.

TABLE II

| Transmission data (SD) | Coded data | Number of "1"s between two "0"s |
|---|---|---|
| HH | 1110 1110 | 3 |
| HL | 1110 1011 | 1 |
| LH | 1011 1110 | 5 |
| LL | 1011 1011 | 3 |

The number of "1"s between the two "0" is directly proportional to a pulse width of a coded signal. And these numbers 1, 3, and 5 imply that the elements of transmission data (SD) have changed from "H" to "L", nothing, and from "L" to "H", respectively. This embodiment uses this rule (a 1:3:5 rule) in the coding scheme as well as a decoding one.

Nevertheless, the last coded data in TABLE I causes an erroneous shift on reading the coded data by this embodiment. Thus both high and low must either start with "1" or end with "1" so that the chance of the "00" sequence is excluded. Since there is no "1" between two "0", this sequence disobeys the 1:3:5 rule.

According to TABLE II, the four-element transmission data (SD) of "HLLH" is translated in terms of "1" and "0":

H L L H
1110 1011 1011 1110.

For the case of these four-figure series, probability of finding "1" in a unit bit is 75%. Therefore, efficiency in the transmission power is 75%. Since the prior art efficiency is 50%, it follows that the transmission power efficiency of the embodiment is improved by 50%. As a result, the HPMOIS enables distant communication that are not possible before and allowing more sophisticated write or read tasks for reliable communication.

In the transmission mode, FIGS. 3A to H illustrate various signals in communication between the interrogator (2) and the transponder (4). The coding circuit (10) receives the four-element transmission data (SD) of "HLLH" from the controller (1) shown in FIG. 3A.

Then the transmission data (SD) is converted into a coded signal in the coding circuit (10) as shown in FIG. 3B. Pulse widths of the coded signal are provided according to the 1:3:5 rule.

The coded signal is modulated by using the carrier wave generator (11) according to the coded signal at the ASK modulator (12) where the coded signal is ASK modulated according to a maximum voltage of the coded signal corresponding to the logic values "1" and a minimum voltage of the coding signal corresponding to the logic values "0". TABLE III summarizes numbers of carrier wave pulses required for different pulse widths in the coded signals.

TABLE III

| Number of "1"s in a pulse width | Number of carrier wave pulses |
| --- | --- |
| 1 | 7 |
| 3 | 21 |
| 5 | 35 |

The ASK modulated signal is shown in FIG. 3C. For convenience, these pulse numbers: 7, 21, 35 are reduced to 4, 12, and 20 in this figure, respectively. It is noted that amplitudes of the ASK modulated are diminished for positions for "0" of the coded signal. The oscillator (13) transmits the ASK modulated signal, as a RF transmission signal, through the inductor (14) to the inductor (44) of the resonant circuit (41).

Now the resonant circuit (41) of the transponder (4) receives the ASK modulated signal from the interrogator (2). The output signal of the circuit (41), a received signal, is shown in FIG. 3D. Energy of the signal is transmitted from the inductor (44) only when the ASK modulator (12) gives the circuit (41) the received signal.

The received signal is transmitted to not only the clock pulse generator (48) that is attached to one end of the resonant circuit (41) but also the envelope generator (47). At the envelope generator (47), the received signal is demodulated into a gate signal shown in FIG. 3E. At the clock pulse generator (48), a clock signal, as shown in FIG. 3F, is generated from the received signal. The number of clock pulses, x, is generated in the clock signal according to clock pulse bands separated by rising and falling edges of the gate signal.

These new signals are forwarded to a data analyzer (49). The data analyzer (49) recounts the numbers of clock pulses in the bands in the clock signal. Then, based upon the 1:3:5 rule mentioned previously, an error check system based on the rule is described in TABLE IV.

Then the clock signal is translated back (or decoded) to a data signal expressed in terms of "H" and "L", shown in FIG. 3G, at the analyzer (49) and also generates a sampling CLK signal, displayed in FIG. 3H. Each Peak in the sampling CLK indicates time for a rising edge of the gate signal.

TABLE IV

| Range of x | Previous data | Results |
| --- | --- | --- |
| $x \leq 13$ | L | Error |
|  | H | H → L |
| $14 \leq x \leq 27$ | L | No change |
|  | H | No change |
| $28 \leq x \leq 41$ | L | L → H |
|  | H | Error |
| $42 \leq x$ | L | Error |
|  | H | Error |

The data signal and the sampling CLK signal are forwarded to the memory controller (50). According to these signal, the controller (50) writes data on a memory (51) in terms of the logic value "1" and "0".

In the reception mode, FIGS. 4A to G illustrate various signals for communication between the interrogator (2) and the transponder (4). In this communication, the interrogator (2) is set in the reception mode by the controller (1). As mentioned previously, the interrogator (2) sends an answering frame repeating three "1"s and one "0" as shown in FIG. 4A.

The answering frame is ASK modulated shown in FIG. 4B; no amplitude is present for "0"s. The ASK modulated signal is transmitted by the inductor (14) and is received by the resonant circuit (41). The output of the circuit (41) is shown in FIG. 4C; residual resonant oscillations are present in the null positions. The output is forwarded to both the envelope generator (47) and the clock pulse generator (48).

A gate signal is generated at the envelope generator (47), shown in FIG. 4D. A clock signal is generated at the clock pulse generator (48), shown in FIG. 4E. These signals are sent to the data analyzer (49) that generates a resonant timing signal as shown in FIG. 4F.

The resonant timing signal is sent to the reception control circuit (52). A rising edge of the resonant timing signal starts at the last two clock pulses of a clock pulse band of the clock signal. And a falling edge ends at the end of the band. The resonant timing signal is used to start resonant oscillations early by one pulse of the received signal so that suitable decays of the oscillations are obtained. The starting times are indicated by dashed arrows extended from FIG. 4F to FIG. 4G. A residual oscillation begins at the start time and ends at the end of a null period of the answering frame. The time between the start time and the null period is defined as a resonant oscillation period.

If there is data in the memory (51), the data in terms of the logic value either "1" and "0" is read by the memory controller (50). Then the data is sent to the reception control circuit (52).

The reception control circuit (52) reads the starting times of residual oscillations and FSK modulates each of the resonant oscillations in the answering frame according to the data read by the memory control unit (50), as shown in FIG. 4G. Two different oscillations fH and fL appears the resonant oscillation periods in the answering frame. During the period, if an element of the data is "1", then the switching element (53) is on; the resonant circuit (41) is connected to the capacitors (42) and (43) such that a residual resonant frequency fL is generated. If the element is "0", then the switching element (53) is turned off; the resonant circuit (41) is now connected to only the capacitor (42) such that a residual resonant frequency fH is generated. The FSK modulated answering frame is transmitted as a residual resonant signal from the circuit (41) to the inductor (16) of the interrogator (2).

Now the residual resonant signal is received at the inductor (16) of the interrogator (2) and amplified at the amplifier (18). The amplified signal is FSK demodulated at the FSK demodulator (21). The switch (19) turns on or off by the reception timing generator (20) according to the switching signal. When the system is in the transmission or rest mode, the switch (19) is used to blockade any noise from the amplifier (18) during these modes.

The FSK demodulated signal is forwarded to the sample-and-hold circuit (22). The circuit (22) converts the demodulated signal to a final code signal in terms of "1" and "0" according to the demodulated signal. And the final coded signal is delivered to the controller (1) as the reception data (RD).

The HPMOIS employs the logic value assignment by fH and fL, briefly mentioned previously, by which the logic value assignment for the residual resonant signal is determined by frequencies fH and fL, of two different residual resonant oscillations corresponding to "0" and "1", respectively. The logic value assignment by the presence and absence of residual resonant oscillations used in the prior art is inapplicable since a residual resonant oscillation for "0" is always present for an HPMOIS.

Explaining details of the logic value assignment by the frequencies, a circuit diagram and a specific function of the FSK demodulator are described in the following.

Figure 5:
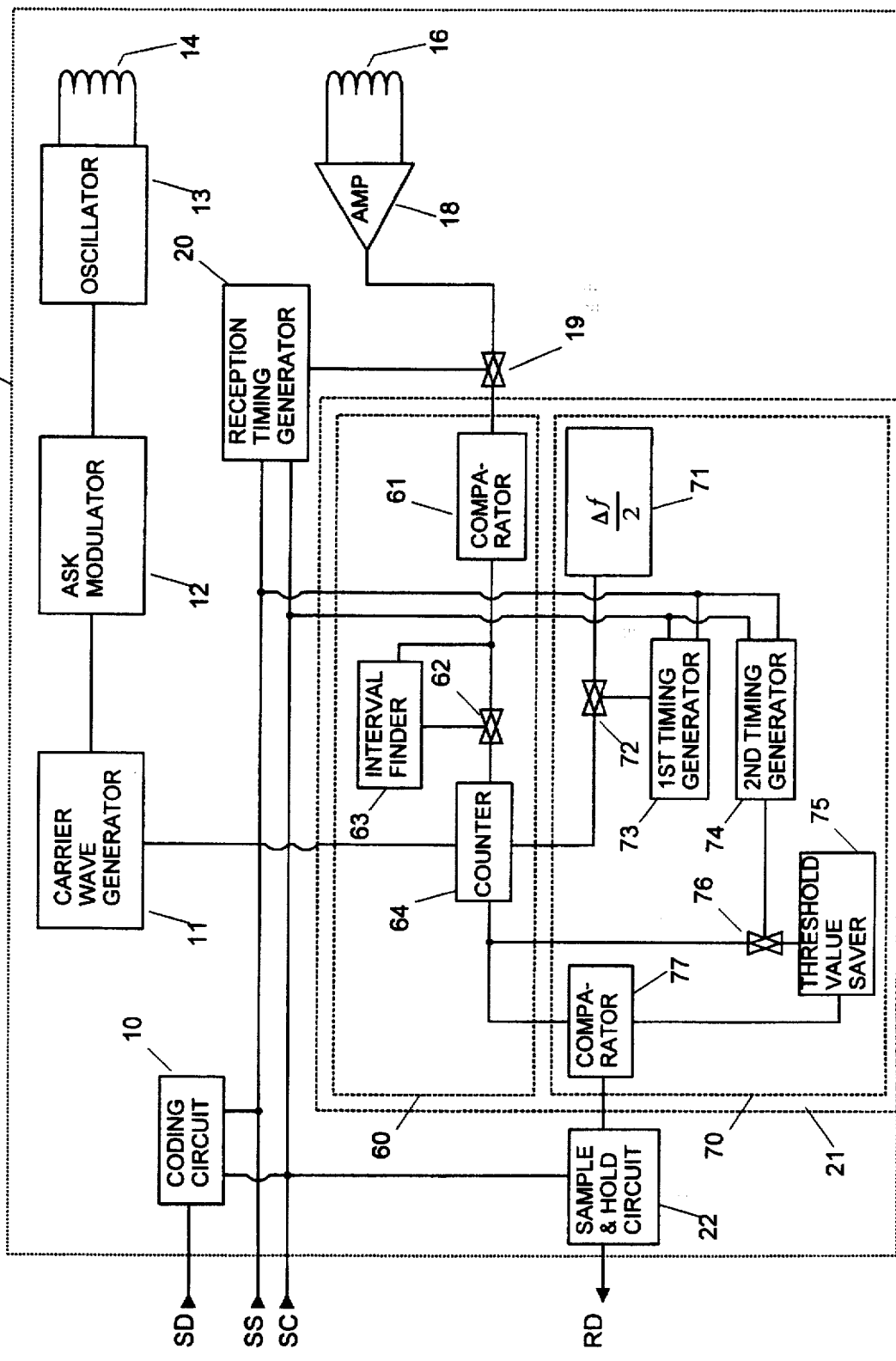
FIG. 5 shows a simple electronic circuit of an FSK demodulator.

FIG. 5 illustrates the circuit diagram of the FSK demodulator (21) that performs the logic value assignment by the different frequencies fH and fL. The demodulator (21) has a counting unit (60) and a comparative unit (70).

The counting unit (60) comprises a comparator (61), an interval finder (63), a switch (62), and a counter (64) and the carrier wave generator (11) comprising a power source (11B), a frequency divider (11C), and a wave generator (11D) (11B through 11D are not shown).

The comparator (61) is to convert a residual resonant signal amplified into a digital signal when the interrogator (2) and the transponder (4) are in the reception mode.

The interval finder (63) is connected with the a switch (62). A function of the finder (63) is to determine a start time and an end time for a complete cycle of a residual resonant oscillation. The start time is defined when a voltage sign indicates the first "+" at the comparator (61) and the end time is set when the voltage signs changes to "−" and "+" again. This determination of the times are repeated two more times and the average value of the three determinations is obtained. After the time duration for the residual oscillation is obtained, the interval finder (63) turns on the switch (62) and transfers the digital signal to the counter (64).

The counter (64) is connected with the carrier wave generator (11), the switches (72) and (62), and the comparator (77). A function of the counter (64) is to count the number of reference pulses, generated by the generator (11), for the time duration determined by the interval finder (63). As soon as the digital signal from the comparator (77) enters to the counter (64), at the start time, it starts counting reference pulses. And after the digital signal leaves the counter (64), at the end time, the counter (64) stops counting the reference pulses and keep the number of the pulses counted. Apparently, waves generated by the carrier wave generator (11) are used as references in the determination of the residual frequencies fH and fL. And each frequency is expressed in terms of the number of reference pulses.

The comparative unit (70) comprises an $\Delta f/2$ (71), a first timing generator (73), a second timing generator (74), a threshold value saver (75), a switch (72), a switch (76) and a comparator (77).

The $\Delta f/2$ (71) is used to store an initial pulse number which corresponds to the reciprocal of half of the frequency difference between fH and fL, $\Delta f$. This number is fixed and computed formerly. As the switch (72) is on, the number is forward to the counter (64). A timing when the switch (72) is on is administrated by the first timing generator (73). A fH pulse number for a test frequency of fH is determined by the counting unit (60). A threshold frequency $f_{th}$ is determined at the counter (64) by adding the reciprocal of the fH pulse number to the reciprocal of the initial pulse number. A threshold pulse number is the reciprocal of $f_{th}$. Thus $f_{th}$ is always located at the midpoint between fH and fL.

The threshold value saver (75) holds the threshold pulse number determined by the counter (64) by turning the switch (76) on. A specific timing when this switch (76) is on is administrated by the second timing generator (74). The threshold pulse number and a counter pulse number are sent to the comparator (77) for comparison.

The comparator (77) is to compare the counter pulse number with the threshold pulse number stored in the threshold value saver (75). If the counter pulse number for a residual resonant oscillation is smaller than the threshold pulse number, then the frequency of the oscillation is fH. (A frequency is a reciprocal of a pulse number.) Thus the logic value "0" is forwarded to the sample-and-holding circuit (22). And if the counter pulse number is larger than the threshold pulse number, then the frequency of the oscillation is fL. Thus the logic value "1" is forwarded to the circuit (22). According to this comparison, a final digital signal is coded at the circuit (22) and sent to the controller (1).

A mechanism to determine the threshold frequency in this embodiment is described in the following.

After Ts has elapsed, Tr1 starts, as shown in FIG. 2. During Tr1, the threshold frequency is determined. Initially, an answering frame is sent from the interrogator (2) to the transponder (4). Then, the frame is transmitted to the transponder (4). After the frame is FSK modulated at the transponder (4), a residual resonant signal is transmitted back to the interrogator (2). An fH pulse number for a test frequency fH, corresponding to the logic value "0"of the frame, is determined by the counting unit (60). In effect, the answering frame is used as a testing signal during Tr1. At this moment, the $\Delta f/2$ (71) turns on the switch (62) in order to send the initial pulse number to the counter (64) where a threshold frequency $f_{th}$, in terms of the pulse number, a threshold pulse number, is determined.

Then after the second Tr, the second timing generator (74) turns on the switch (72) in order that the threshold value saver (75) keeps the threshold pulse number from the counter (64). And after the second Tr, the first and second timing generators (73) and (74) are at rest. At the comparator (77), each residual frequency in the residual resonant signal, in terms of a reference pulse number, is compared with the threshold pulse number from the saver (75). The sample-and-hold circuit (22) received results from the comparator (77) in order to generate a final coded signal.

Once the entire communication is over, a new threshold pulse number is determined for a new Tr.

In the case of close communication between the transponder (4) and the interrogator (2), magnetic coupling of the inductors (16) and (44) is likely to occur. Constant values for the inductors and capacitors are also likely to change. As a result, frequencies fL and fH are shifted unexpectedly by an inductance change due to the magnetic coupling although the frequency difference is unlikely to change. But still the logic value assignment used in this embodiment is applicable since $f_{th}$ is also shifted according to the shift of the frequencies fH and fL; thus, $f_{th}$ is always adjusted or calibrated correspondingly with the frequency shift.

When the separation between the interrogator (2) and the transponder (4) is extremely close, it results that residual resonance oscillations of a received signal at the resonance circuit (41) possess large amplitudes, as large as those of non residual resonant oscillations. Consequently, it is extremely difficult to generate a gate signal from this high energy signal at the envelope generator (47). In order to overcome this problem, the present invention employed wave energy reductions for controlling the coding of the coded signal by a level decider (23) connected with the coding circuit (10) and the switch (19), and the FSK demodulator (21).

The number of wave energy reductions is depending on energy difference between an energy level of a check signal such as an answering frame and a threshold level determined by the level decider (23) such that the gate signal is obtainable. Distinct appearances of residual resonant oscillations occurs promptly when the energy level of the check signal diminishes to the threshold level properly.

If the energy level is greater than the threshold level, the level decider (23) sends a limiting signal to a coding circuit (10). At the ASK modulator (12), the energy of the check signal is reduced by decreasing the number of pulses for high by one and increasing the interrupted period for low by the decreased pulse duration; thus the smaller energy signal having longer interrupted time intervals for low.

Figure 6A:
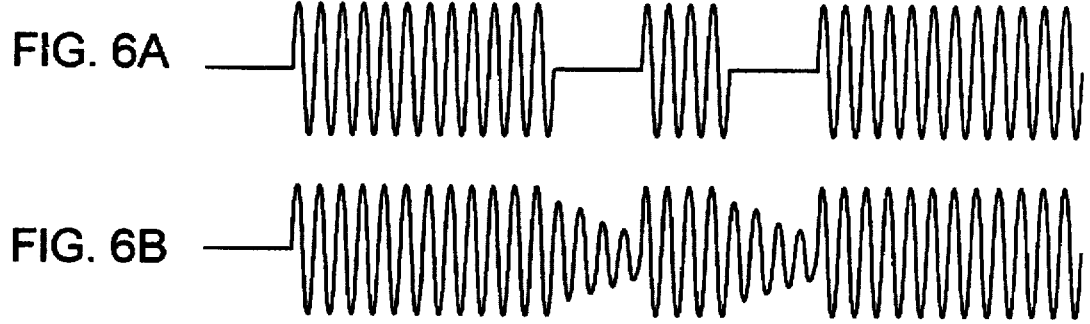
FIGS. 6A through D shows signal conversions with a level decider responsible for reducing energy of a transmission signal in extremely close communication and without the decider in normal distant communication.
Figure 6B:
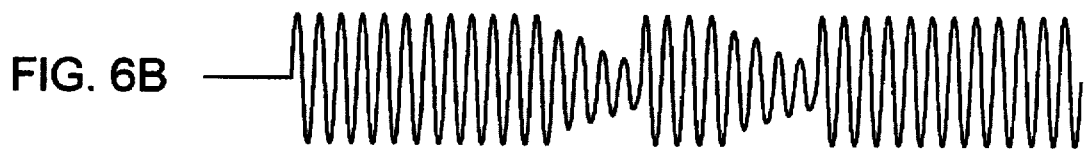
Figure 6C:
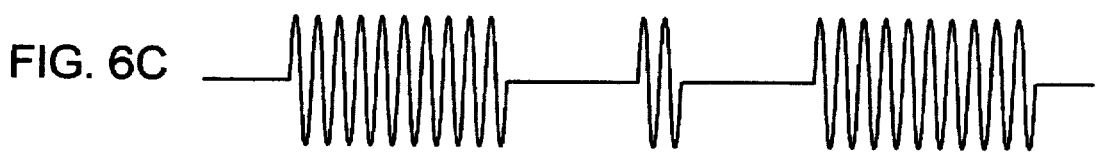
Figure 6D:
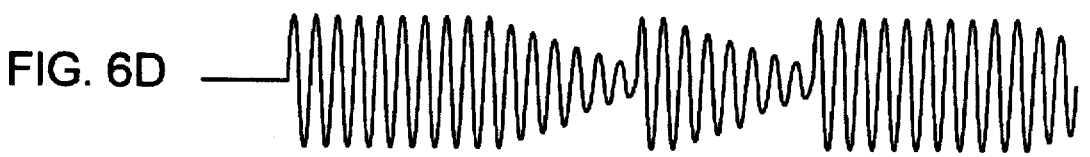

The check signal treated by the wave energy reduction is ASK modulated as shown in FIG. 6C and is transmitted to the resonance circuit (41) of the transponder (4) as shown in FIG. 6D. Two wave energy reductions are performed in this case. FIG. 6A shows an ASK modulated signal unreduced and FIG. 6B shows a transmitted signal of the ASK modulated signal unreduced for normal distant communication. The output in the resonance circuit (41) is transferred both to the envelope generator (47) and the clock pulse generator (48). A gate signal and a clock signal are forwarded to the data analyzer (49). A data signal and the sampling CLK are generated at the data analyzer (49) and forwarded to the memory controller (50).

In the reception mode, a residual resonant signal of the reduced check signal is FSK demodulated and, later, the sample-and-hold circuit (22) where the logic value assignment for residual resonant oscillations of a reduced residual resonant signal is performed in order to obtain a final digital signal, eventually sent to the controller (1) as RD.

Then the reduced check signal is sent to the transponder (4) and forward to the reception unit of the interrogator (2). If the energy level of this signal is greater than the threshold level, then another limiting signal is sent by the level decider (23) to the coding circuit (10) for a further wave energy reduction. The wave energy reduction is repeated until the energy level of the check signal becomes less than the threshold level.

If the wave energy reductions is performed for n times, then the reductions are summarized by the following:

1) if two transmission data (SD) elements has no change such as HH or LL, (21−n) carrier wave pulses for high and (7+n) pulses for low in an ASK modulated signal are generated, 2) if the data elements are HL, (7−n) pulses for high and (7+n) pulses for low in an ASK modulated signal are generated; and 3) if the data elements are LH, (35−n) pulses for high and (7+n) pulses for low in an ASK modulated signal are generated.

The expanded transmittable range of HPMOIS is extended further technically by the wave energy reduction since the extremely close communication is possible.

Now referring to write and read utilities of a transponder (4) in this embodiment. Writing and reading data in the transponder is described in the following. The transponder (4) has a memory controller (50) mainly responsible for writing data on and reading data from the memory (51). The WRITE instruction is defined as four procedures of the HPMOIS. On the other hand, the READ instruction is defined as a procedure, rather simple, of the HPMOIS.

Figure 7:
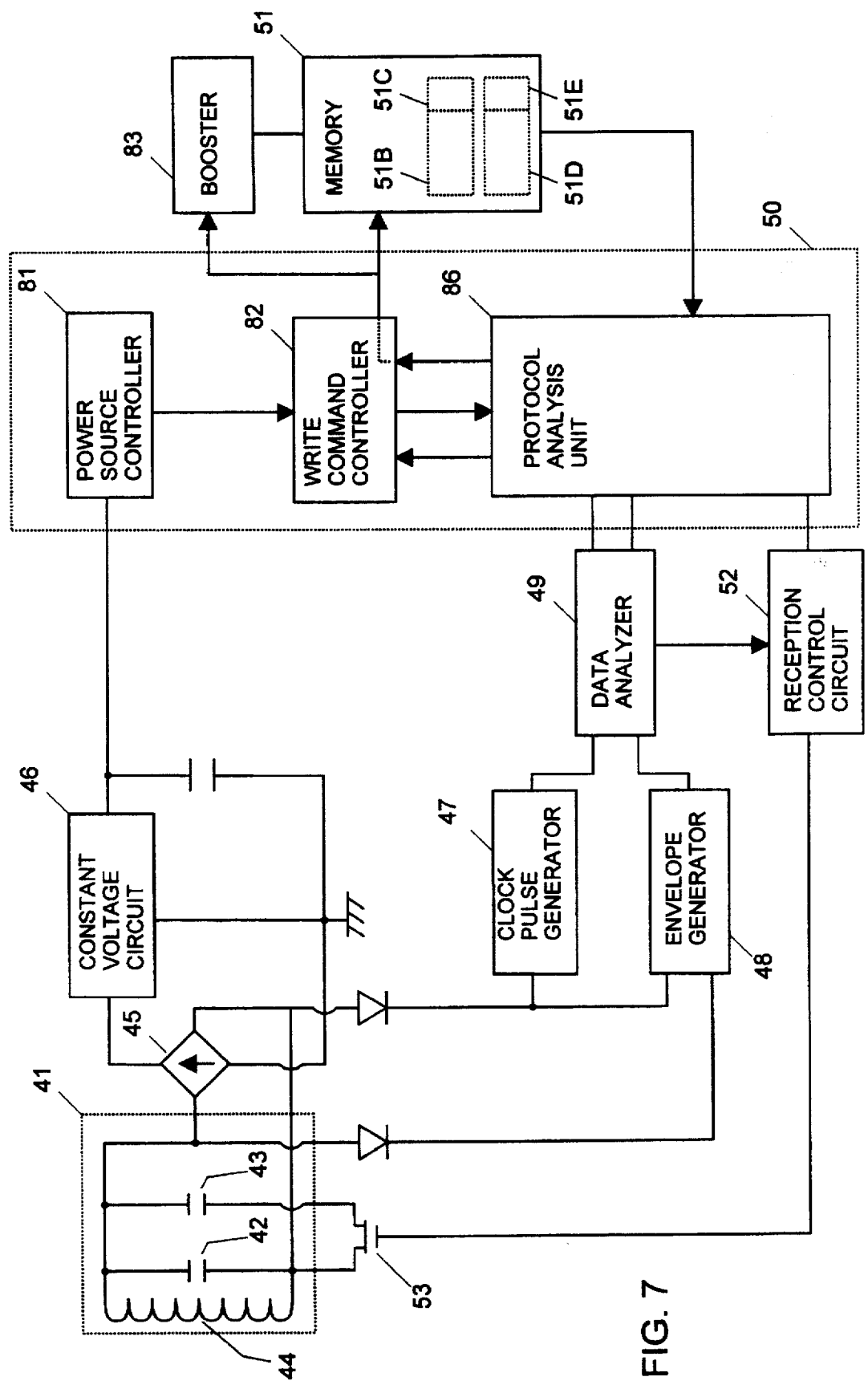
FIG. 7 shows a schematic diagram for a transponder capable of writing data on and reading data from a memory.

FIG. 7 illustrates a circuit diagram of the transponder (4) featuring the memory controller (50) comprising a protocol analysis unit (86), a write command controller (82), and a power source controller (81) for checking a voltage level of the constant voltage circuit (46), a memory (51) and a booster (83). The other components of the diagram are the same as ones in FIG. 1; the interrogator (2) and the controller (1) are also the same as ones used in FIG. 1; the host computer is the same as well.

The memory (51) has an actual writing (51B), a dummy writing (51C), response (51D), error message (51E) partitions, respectively.

The controller (1) is linked with the computer and connected with the interrogator (2). Various commands from the computer is sent to the controller (1) and then to the interrogator (2) where the commands are transmitted in the form of RF waves. Responses or read data from the transponder (4A) are received by the interrogator (2) and then sent to the controller (1). The controller (1) checks the responses and compares the read data with original data.

The protocol analysis unit (86) is associated with the write command controller (82), the data analyzer (49) the reception control circuit (52), and the memory (51). Purposes of the protocol analysis unit (86) is to set on a permission flag in the writing command controller (82), to write on or read from data the memory (51), and to receive a signal from the write command controller (82) if the voltage of the power source controller (81) is insufficient to execute write data on and read data from the actual partition (51B). Moreover, the unit (86) reads a brief message from the response partition (51D) and to send a response including the message to the interrogator (2). The response is forwarded to and checked by the controller (1).

The write command controller (82) is connected with protocol analysis unit (86), the memory (51), the booster (83), and the power source controller (81). When a permission flag is checked by the power source controller (81), the write command controller (82) sends a signal implying the immediate termination of WRITE/READ instructions to the protocol analysis unit (86). Also, when the flag is on the write command controller (82) receives a write command from the protocol analysis unit (86). When the write command is executed, the booster (83) increases its voltage.

The power source controller (81) checks the voltage of the constant voltage circuit (46) during the entire WRITE/READ instructions. If the voltage becomes below a necessary voltage for the execution of the procedures, the power source controller (81) prompts the write command controller (82) to turn off the permission flag.

Figure 8:
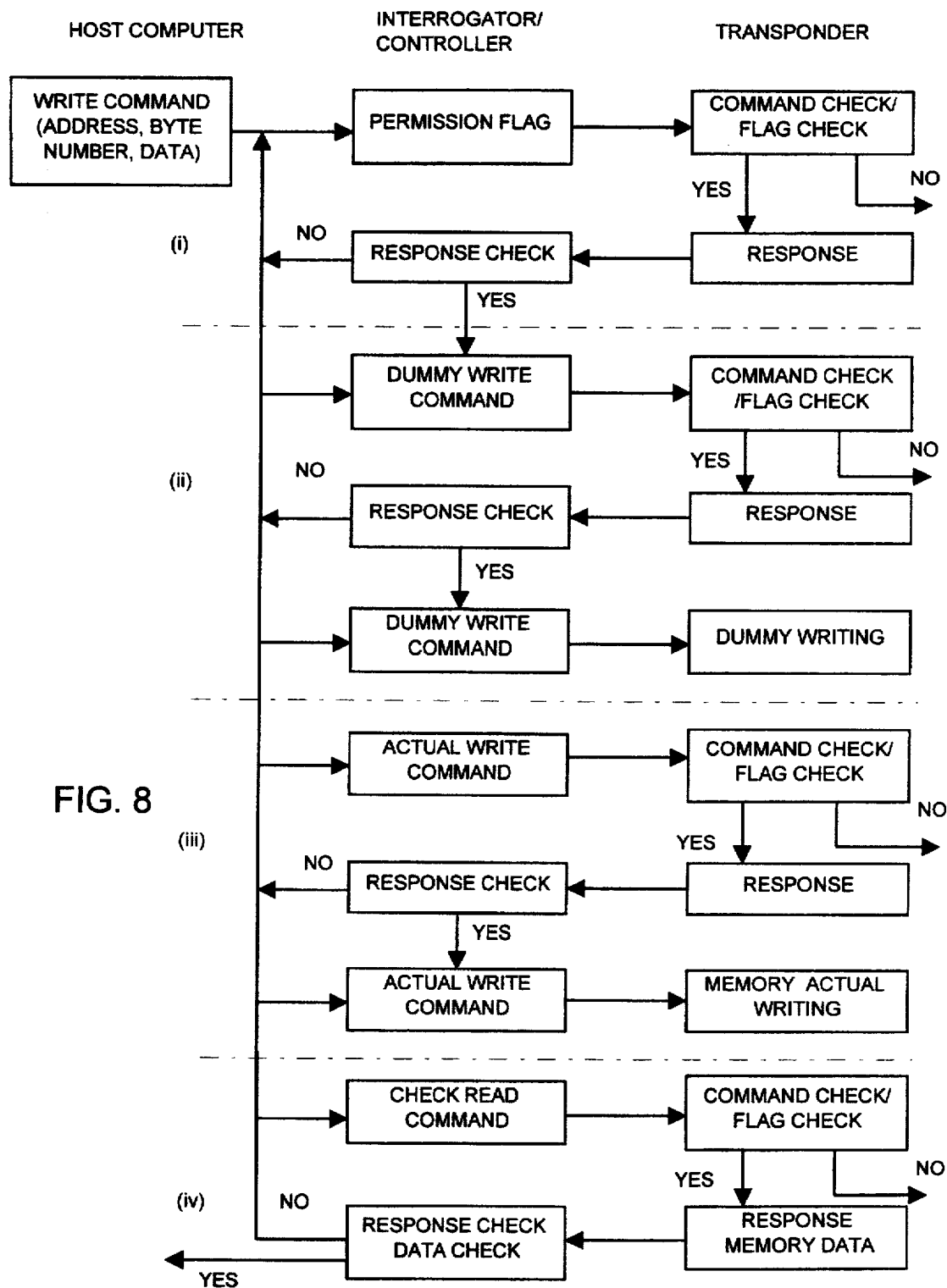
FIG. 8 shows a flow chart for a WRITE instruction with the memory described in FIG. 7.

FIG. 8 shows a flow chart for the WRITE instruction of the embodiment. The instruction consists of four small procedures: (i) permission flag, (ii) dummy writing, (iii) actual writing, and (iv) check read procedures.

For the permission flag procedure, the host computer sends transmission data (SD) including address, bit number, a flag command, and other useful information to the controller (1). The controller (1) sends the flag command, by way of the interrogator (2) to the protocol analysis unit (86). The command goes through the resonant circuit (41), the clock pulse generator (47), the envelope generator (48), and the data analyzer (49) and reaches to the unit (86). The command is checked by the unit (86). If the command is correct, then the unit (86) sends a signal to set a permission flag at the writing command controller (82). Then the writing command controller (82) sets the permission flag. If the voltage of the transponder (4) becomes less than a necessary voltage for the writing, the flag is reset by the writing command controller. If the voltage is sufficient and the flag is still on, then the writing command controller (82) sends a signal back to the protocol analysis unit (86). As soon as both the command check and the flag check are confirmed to be yes, the protocol analysis unit (86) reads an answer yes from the response partition (51D) for a response yes. An answer no is also stored in this memory partition. The response yes is forwarded to the reception control circuit (52) and transmits to the interrogator (2) and later to the controller (1) for a controller check. If this check is successful, then the WRITE instruction advances to the next procedure.

But either if the command is incorrect or if the flag is reset or off, then the unit (86) reads the answer no from the response partition (51D) and sends a negative response to the controller (1). Then the WRITE instruction is immediately terminated in the permission flag procedure. The controller (1) acknowledges the negative response.

For the dummy writing procedure, after the previous response yes has been checked at the controller (1), the interrogator (2) forwards a dummy write command from the controller (1) to the protocol analysis unit (86). The unit (86) reviews contents of the dummy write command and checks the flag. If a response is yes, then the unit (86) sends the positive response to the interrogator (2) and, later, to the controller (1) for a controller check. If this check is yes also, then the interrogator sends the same dummy writing command from the controller (1) to the unit (86). Then the unit (86) writes data on a dummy partition (51C) (FF segment) according to the command. Then the WRITE instruction advances to the next procedure.

But if the response is no, that is either if the flag is off or if the dummy command is incorrect, then the WRITE instruction is terminated by the unit (86) immediately. The unit (86) sends a negative response to the controller (1) where the response is acknowledged.

For the actual writing procedure, the interrogator (2) sends an actual write command from the controller (1) to the protocol analysis unit (86) after the previous response yes has been checked at the controller (1). The unit (86) checks the command and the flag. If a response is yes, then the unit (86) sends the positive response to the interrogator (2). And if the controller check is confirmed to be yes, then the same actual write command is sent to the unit (86) again and the data is written on the actual partition (5 1B) according to the command. Then the WRITE instruction advances to the next procedure.

If the response results in no, the WRITE instruction ends immediately.

For the check reading procedure, the last procedure the interrogator (2) sends a check read command from the controller (1) to the unit (86) after the previous response yes has been checked at the controller (1). The protocol analysis unit (86) reviews the check read command and checks the flag. If a response is yes, then the unit (86) sends the positive response to the interrogator (2). Then the unit (86) reads the written data from the actual partition (51B) according to the check read command. The data read in the form of a residual resonant signal is transmitted from the resonant circuit (41) to the inductor (16) of the interrogator (2) and to the controller (1). The controller (1) not only checks the response but also performs comparison of the read data with the data intended to be written. Then a result of the comparison is sent to the host computer. (The read data is not sent to the host computer.)

But if the response is no, then the check reading procedure is terminated. The WRITE instruction is exited.

For a READ instruction, similar to the check reading procedure, the interrogator (2) sends an actual read command from the controller (1) to the protocol analysis unit (86). (A flow chart of this instruction is not shown.) The command and the permission flag are checked by the protocol analysis unit (86). If a response is yes, then the unit (86) sends the positive response and the data read from the actual partition (51B) to the interrogator (2). The data is forwarded to the controller (1) and eventually the host computer.

If the response is no, then the protocol analysis unit (86) sends an error message stored in an error message partition (51E) to the interrogator (2). And the actual read command is not executed. The READ instruction is terminated.

(Embodiment 2)

The wave energy reductions described above involve multiple executions of the reductions at the ASK modulator (12). In other words, multiple limiting signals are needed to achieve the complete reduction. However, it is possible to use an A/D conversion circuit (25) (not shown) instead of the level decider (23) for a complete wave energy reduction at one.

The embodiment 2 is identical to the embodiment 1 except the use of the A/D conversion circuit (25).

Similar to the case of the wave energy reduction described above, a residual resonant signal amplified is transmitted by way of the switch (19) into the A/D conversion circuit (25) where a energy level of an answering frame is determined, the threshold energy level is stored, and the energy level are compared with the threshold energy level. The location of the A/D conversion circuit (25) is the same of that for the level decider (23) in FIG. 1. The A/D conversion circuit (25) computes a necessary number of wave pulses reduced, n, such that the energy level becomes less than the threshold energy level. At the coded circuit (10), the time worth for n pulses is subtracted from each high durations and added to each low durations in a coded signal.

In the case that the wave energy reduction is performed, at once by the following rule:

1) if two transmission data (SD) elements has no change such as HH or LL, (21−n) carrier wave pulses for high and (7+n) pulses for low an ASK modulated signal are generated, 2) if the data elements are HL, (7−n) pulses for high and (7+n) pulses for low an ASK modulated signal are generated, and 3) if the data elements are LH, (35−n) pulses for high and (7+n) pulses for low an ASK modulated signal are generated.

Using this wave energy reduction, there is no need to send the limiting signal several times and all the communications for the checks. Thus, the time need to accomplish the complete wave energy reduction is greatly reduced.

(Embodiment 3)

It is possible to improve the life time of the memory (51). A typical life time is about 10,000 writings. In order to prolong the life time of the memory (51), a blank writing procedure, a dummy instruction, is employed to reduce the number of writings on the memory (51).

The embodiment 3 is exactly the same as the embodiment 1 except the blank writing procedure in a WRITE instruction.

A circuit diagram of a transponder (4) that performs the blank writing is exactly the same one described in FIG. 7. The blank writing procedure is described in the following since the other steps of the WRITE instruction and the READ instruction are exactly the same as described in FIG. 8.

For the blank writing procedure, the interrogator (2) forwards a blank write command to the transponder (4) after a previous response has been checked at the controller (1). The protocol analysis unit (86) reviews contents of the blank write command and checks the flag. If the command is correct and the flag is on, then the unit (86) sends a response yes to the interrogator (2). The positive response is sent to the controller. If the controller check is yes, then the interrogator (2) sends the same blank write command from the controller again to the unit (86). Consequently, the same amount of electric current for the dummy writing in the embodiment 1 is consumed by the booster (83), but there is no writing on the memory (51).

But either if the flag is reset during the blank writing procedure or the command is incorrect, then the unit (86) terminates the blank writing and the WRITE instruction immediately.

(Embodiment 4)

It is also possible to prolong the life time of the memory (51) tremendously by using a RAM writing procedure.

The embodiment 4 is exactly the same as the embodiment 1 except that the WRITE/READ instructions are performed with a RAM.

Figure 9:
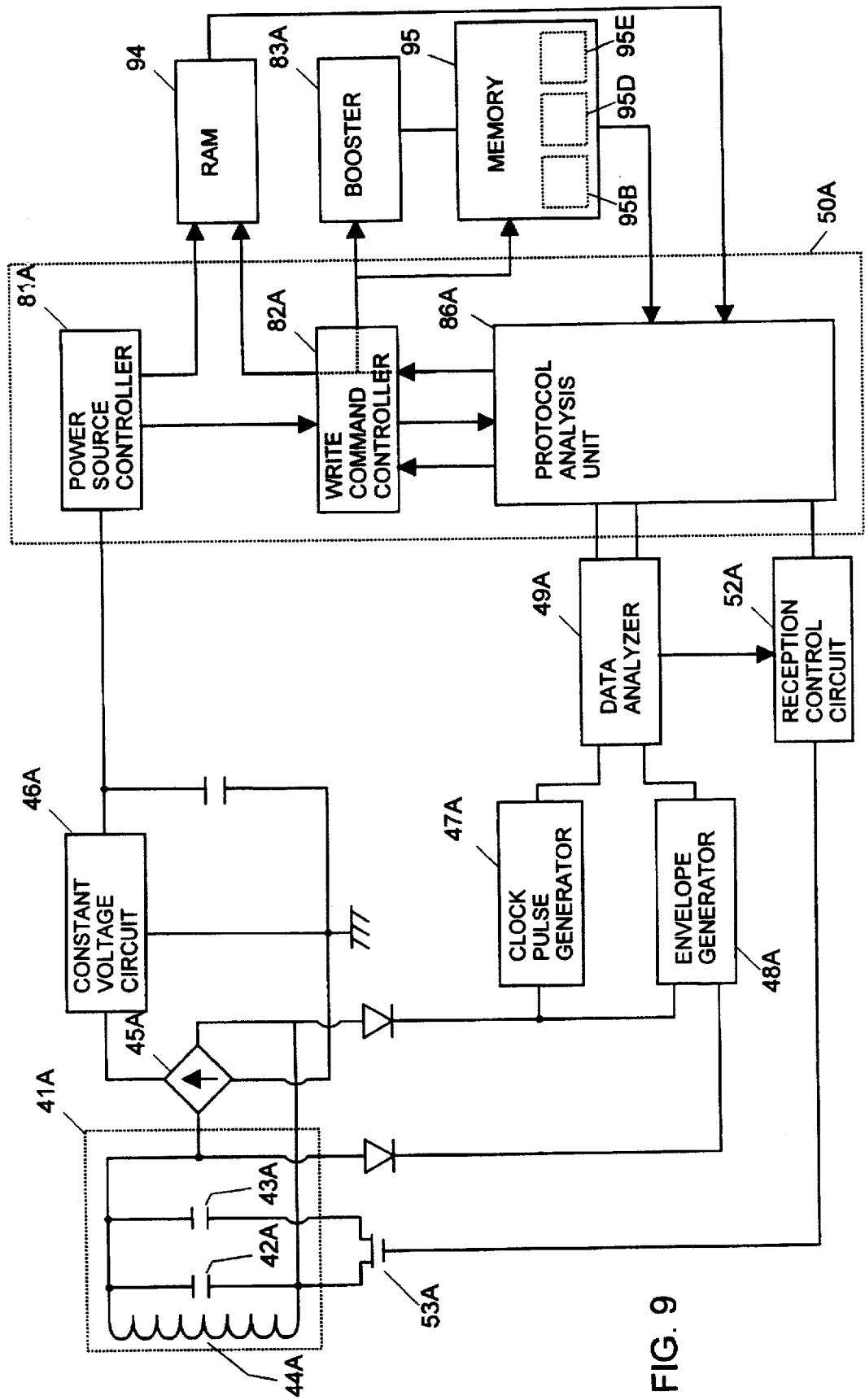
FIG. 9 shows a schematic diagram for another transponder capable of writing data on and reading data from a memory with a RAM.

FIG. 9 illustrates a simple circuit diagram of a transponder (4A) that performs the RAM writing procedure. The transponder (4A) features a protocol analysis unit (86A), a write command controller (82A), a power source controller (81), a memory (95), a power source controller (81A), and a RAM (94). Like parts are designated by like numerals with a suffix letter of "A".

The memory (95) has actual (95B), response (95D), and error message partitions (95E).

Figure 10:
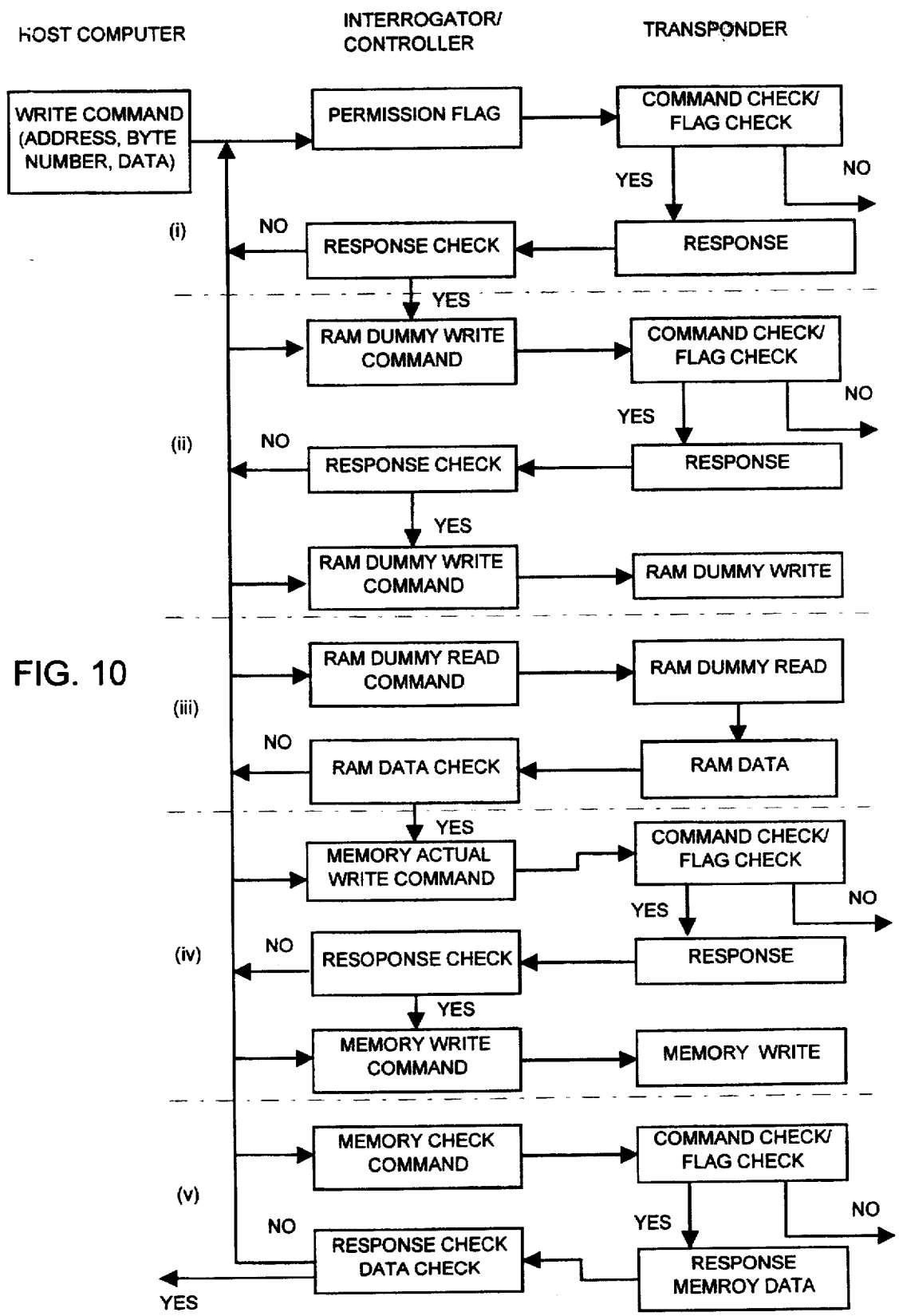
FIG. 10 shows a flow chart for a WRITE instruction with the memory described in FIG. 9.

FIG. 10 shows a flow chart for a WRITE instruction of the embodiment with the application of the transponder (4A) with the RAM (94). The WRITE instruction includes (i) permission flag, (ii) RAM dummy writing, (iii) RAM dummy reading, (iv) memory writing, and (v) memory check procedures.

For the permission flag procedure, the controller (1) sends transmission data (SD) including address, bit number, a flag command and other useful information to the interrogator (2). The interrogator (2) sends the flag command to the protocol analysis unit (86A) that checks the command. A permission flag in the write command controller (82A) is turned on after a signal is sent by the unit (86). Then the power source controller (81 A) initializes the RAM (94). If the voltage of the transponder (4A) is greater than the necessary voltage for the writing, then the write command controller (82A) sends a signal back to protocol analysis unit (86A) for a flag check. When the command check and the flag check are confirmed to be yes at the unit (86), a response yes read from the response partition (95D) is forwarded to the reception control circuit (52A) and transmits back to the interrogator (2). Then the WRITE instruction advances to the next procedure.

But if the response is no by either that the command is incorrect or that the flag is rest due to an insufficient voltage, the unit (86) sends a response no read from the response partition (95D) to the controller (1) that checks the response. The WRITE instruction is terminated immediately.

For the RAM dummy writing procedure, the interrogator (2) forwards a RAM dummy write command from the controller (1) to the transponder (4A) after the previous response has been checked at the controller (1). The protocol analysis unit (86A) of the transponder (4A) reviews contents of the command and checks the flag. If these command and flag checks are yes, the unit (86A) sends a response yes to the interrogator (2). The controller (1) confirms the response and sends the same command to the transponder (4A) again. Then the unit (86A) writes data on the RAM (94) according to the command. The WRITE instruction advances to the next procedure.

If the voltage of the power source controller (81 A) decreases to less than the necessary voltage for the dummy writing, then the permission flag is reset by which the power source controller (81A). The RAM (94) is initialized, and the WRITE instruction is terminated. If the RAM dummy write command is incorrect, the WRITE instruction is terminated immediately. As a result, the response from the unit (86A) is no. The controller (1) recognizes the negative response.

For the RAM dummy reading procedure, the interrogator (2) sends a dummy read command to the unit (86A) after the previous response has been checked at the controller (1). The unit (86A) reads the data written on the RAM (94) in the previous procedure according to the RAM read command and sends the data to the controller (1) that checks the data. If the data is correctly written in the RAM (94), then the WRITE instruction advances to the next procedure.

But if the data is incorrectly written, then the WRITE instruction is terminated.

For the memory writing procedure, after the confirmation of the written data by the controller (1), the interrogator (2) sends an memory actual write command to the protocol analysis unit (86A). The unit (86A) checks the command and the flag. If these checks are confirmed to be yes, then the unit (86A) sends a response yes to the interrogator (2). The controller (1) checks the response. If the response is confirmed to be yes also, then the controller (1) sends the same command again to the unit (86A) that writes data on the memory (95B) according to the command. The WRITE instruction advances to the next procedure.

But if the response is no, then the unit (86A) terminates the WRITE instruction immediately.

For the memory check procedure, the last procedure, the interrogator (2) sends a memory check command from the controller (1) to the transponder (4A). The protocol analysis unit (86A) checks the command and the flag. If these checks are confirmed to be yes, then the unit (86A) sends a response yes to the interrogator (2). The controller (1) checks the response. If the controller check is yes, then the controller (1) sends the same command to the unit (86A) that reads the stored data from the memory (95B) according to the command. The data read is transmitted in the form of a residual resonant signal from the resonant circuit (41 A) to the controller (1) through the interrogator (2). The controller (1) not only checks the response but also performs comparison of the read data with the data intended to be written. Then a result of the comparison is sent to the host computer. (The read data is not sent to the host computer.)

For a READ instruction by using the transponder (4A) with the RAM (94), the interrogator (2) sends an actual read command from the controller (1) to the transponder (4A). Both the command and the flag are checked by the protocol analysis unit (86A). If these checks are confirmed to be yes, then the unit (86A) reads an answer yes from the partition (95D) and stored data from the partition (95B). Then the unit (86A) sends a response yes and the data to the interrogator (2). The controller (1) checks the response and the data. A result of the data check is reported to the host computer.

But if the actual writing procedure is unsuccessful and the flag off, then the protocol analysis unit (86A) reads an answer no from the partition (95D) and an error message from an error partition (95E). The unit (86A) sends the error message and a response no to the interrogator (2). The controller (1) checks the response and the error massage.

(Embodiment 5)

It is possible to omit negative responses sent by the protocol analysis unit (86) to the controller (1) and the negative response checks by the controller (1) for a WRITE instruction. These response-check correspondences are time consuming and uneconomical due to extra memory locations needed in the memory (51). Thus it is possible to remove all negative responses and negative response checks from FIG. 8. Whenever responses ends to no in the WRITE instruction, the transponder (4) terminates the WRITE instruction immediately and waits a wake-up call from the controller (1).

It is even possible to omit the negative response, the negative response check, and the error message reply in the READ instruction. The advantage of this omission is based on the simplification of the memory (95), leading to cost reduction, and the elimination of ineffective communication time caused by these replies and check, leading to smoother communication. In the case of the previous READ instruction, it is necessary to prepare a additional memory location for the error message.

The embodiment 5 is exactly the same as the embodiment 1 except the omissions of the negative responses send by the protocol analysis unit (86) and the negative response checks by the controller (1) and memory partitions responsible for a negative answer and of the error message reply and memory partition responsible for the reply.

A WRITE instruction by using the embodiment 5 is described in the following. In this case, the memory (51) needs the actual (51B), the dummy (51C) partitions, and the response partition (51D), actually smaller than that in the embodiment 1.

The WRITE instruction of the embodiment consists of the same category of small procedures: (i) permission flag, (ii) dummy writing, (iii) actual writing, and (iv) check read procedures.

For the permission flag procedure, the host computer sends transmission data (SD) including address, bit number, a flag command, and other useful information to the controller (1). The controller (1) sends the flag command, by way of the interrogator (2) to the protocol analysis unit (86). The command goes through the resonant circuit (41), the clock pulse generator (47), the envelope generator (48), and the data analyzer (49) and reaches to the unit (86). The command is checked by the unit (86). If the command is correct, then the unit (86) sends a signal to set a permission flag at the writing command controller (82). Then the writing command controller (82) sets the permission flag. If the voltage of the transponder (4) becomes less than a necessary voltage for the writing, the flag is reset by the writing command controller. If the voltage is sufficient and the flag is still on, then the writing command controller (82) sends a signal back to the protocol analysis unit (86). As soon as both the command check and the flag check are confirmed to be yes, the protocol analysis unit (86) reads an answer yes from the response partition (51D) for a response yes. An answer no is also stored in this memory partition. The response yes is forwarded to the reception control circuit (52) and transmits to the interrogator (2) and later to the controller (1) for a controller check. If this check is successful, then the WRITE instruction advances to the next procedure.

But either if the command is incorrect or if the flag is reset or off, then the unit (86) reads the answer no from the response partition (5 1D) and sends a negative response to the controller (1). Then the WRITE instruction is immediately terminated in the permission flag procedure. The transponder (4) waits a wake-up call from the controller (1).

For the dummy writing procedure, after the previous response yes has been checked at the controller (1), the interrogator (2) forwards a dummy write command from the controller (1) to the protocol analysis unit (86). The unit (86) reviews contents of the dummy write command and checks the flag. If a response is yes, then the unit (86) sends the positive response to the interrogator (2) and, later, to the controller (1) for a controller check. If this check is yes also, then the interrogator sends the same dummy writing command from the controller (1) to the unit (86). Then the unit (86) writes data on a dummy partition (51C) (FF segment) according to the command. Then the WRITE instruction advances to the next procedure.

But if either if the command is incorrect or if the flag is reset or off, then the WRITE instruction is terminated by the unit (86) immediately. The transponder (4) waits a wake-up call from the controller (1).

For the actual writing procedure, the interrogator (2) sends an actual write command from the controller (1) to the protocol analysis unit (86) after the previous response yes has been checked at the controller (1). The unit (86) checks the command and the flag. If a response is yes, then the unit (86) sends the positive response to the interrogator (2). And if the controller check is confirmed to be yes, then the same actual write command is sent to the unit (86) again and the data is written on the actual partition (51B) according to the command. Then the WRITE instruction advances to the next procedure.

If either if the command is incorrect or if the flag is reset or off, the WRITE instruction ends immediately. The transponder (4) waits a wake-up call from the controller (1).

For the check reading procedure, the last procedure the interrogator (2) sends a check read command from the controller (1) to the unit (86) after the previous response yes has been checked at the controller (1). The protocol analysis unit (86) reviews the check read command and checks the flag. If a response is yes, then the unit (86) sends the positive response to the interrogator (2). Then the unit (86) reads the written data from the actual partition (51B) according to the check read command. The data read in the form of a residual resonant signal is transmitted from the resonant circuit (41) to the inductor (16) of the interrogator (2) and to the controller (1). The controller (1) not only checks the response but also performs comparison of the read data with the data intended to be written. Then a result of the comparison is sent to the host computer. (The read data is not sent to the host computer.)

But if either if the command is incorrect or if the flag is reset or off, then the check reading procedure is terminated.

The WRITE instruction is exited. The transponder (4) waits a wake-up call from the controller (1).

The READ instruction with the omission is described in the following. For the case that the WRITE instruction is unsuccessful and the flag is reset. The unit (86) recognizes the flag is off and then terminates the READ instruction immediately and wait for a wake-up call from the controller (1). If either if the command is incorrect or if the flag is reset or off during the READ instruction, then the unit (86) also terminates the READ instruction immediately and wait for a wake-up call from the controller (1).

What is claimed is:

1. A system for identifying a moving object comprising:

an interrogator transmitting an RF transmission signal indicative of transmission data;

a transponder adapted to be mounted on said moving object for transmitting an RF answer signal indicative of answer data available at said transponder to said interrogator upon receiving said transmission signal, said transponder including energy storing means which stores energy from said RF transmission signal for powering said transponder;

said interrogator comprising:

coding means for providing, from said transmission data, a coded signal in which one logical level of said transmission data is represented by a first series of binary digits and another logical level of said transmission data is represented by a second series of binary digits;

a carrier wave generator for generating a carrier wave; and a modulator for modulating said carrier wave by said coded signal in an amplitude shift keying (ASK) technique to give an ASK modulated signal in which a binary digit "1" of said coded signal is represented by a maximum amplitude of said carrier wave and a binary digit "0" is represented by the absence of said carrier wave, said ASK modulated signal defining said transmission signal;

said transponder comprising:

a demodulator for demodulating said ASK modulated signal into a demodulated signal having a sequence of pulses of varying width; and decoding means for decoding said demodulated signal into said transmission data;

wherein, said coding means of the interrogator is configured to provide each said first and second series of binary digits such that a number of binary digit "1" in each series of binary digits is greater than a number of the binary digit "0" in each series of binary digits.

2. The system as set forth in claim 1, wherein each of said first and second series of binary digits has only one binary digit "0"; and wherein each of said first and second series begins with the binary digit "1" or ends with the binary digit "1".

3. The system as set forth in claim 1 or 2, wherein each of said first and second binary series consists of three binary digit "1"s and a single binary digit "0".

4. The system as set forth in claim 1, wherein said transponder comprises:

a resonant circuit which oscillates in resonance with said ASK modulated signal to cause a residual oscillation within a period corresponding to the absence of said carder wave, said period defining an answer frame within which said transponder transmits said answer signal, and an FSK modulator for modulating said answer data in a frequency shift keying (FSK) technique to give said answer signal in which one logical level of said answer data is represented by a first frequency and another logical level of said answer data is represented by a second frequency, said modulator including switch means which is connected to said resonant circuit so that said resonant circuit effects said residual oscillation in said answer frame selectively at said first frequency and at said second frequency in accordance with the varying logical level of said answer data; and wherein said interrogator comprises an FSK demodulator which demodulates said answer signal into said answer data.

5. The system as set forth in claim 4, wherein said transponder comprises means for sending a test signal as said answer signal back to the interrogator in response to a calibration instruction included at the beginning of said transmission signal, said test signal having a test frequency which corresponds to said first frequency and which varies with varying circuit constant of said resonance circuit;

said FSK demodulator comprising means which compares said first and second frequencies of said answer signal with a threshold frequency so as to modulate said answer signal into said answer data; and said interrogator comprising means for determining said threshold frequency as a function of said test frequency received in response to said calibration instruction.

6. The system as set forth in claim 4, wherein said interrogator comprises:

comparator means for comparing the level of the answer signal from said transponder with a threshold level so as to provide a limit signal when the level of said answer signal exceeds said threshold level;

coding control means responsive to said limit signal for controlling said coding means to reduce the number of pulses in said ASK modulate signal representing said binary digit "1".

7. The system as set forth in claim 6, wherein said coding control means responds to said limit signal for controlling said coding means to decrease the number of pulses in said ASK modulated signal representing said binary digit "1" by one pulse and to elongate a subsequent absent period of said ASK modulated signal indicative of said binary digit "0" by a time corresponding to said one pulse.

8. The system as set forth in claim 6, wherein said comparator means determines the difference between the level of the answer signal and said threshold level to provide said limit signal representative of said difference; and wherein said coding control means responds to said limit signal for decreasing the number of pulses in said ASK modulated signal representing said binary digit "1" by an extent corresponding to said difference and to elongate the subsequent absent period of said ASK modulated signal indicative of said binary digit "0" by a time corresponding to the reduced number of pulses.

9. The system as set forth in claim 1, wherein said transponder comprises a memory in which transmission data from said interrogator is written and from which said transponder reads said answer data in accordance with a READ instruction included in said transmission data; and wherein said interrogator comprises control means which, in response to a WRITE instruction, provides to said transponder a check order of writing said transmission data into an extra area of said memory with an energy consumption at said energy storing means, in precedence to writing said transmission data into a specified area of said memory, a voltage monitor being provided in said transponder to monitor a voltage available at said energy storing means, said voltage monitor enabling said transmission data to be written into said memory when the monitored voltage is sufficient for writing said transmission data into said memory and disabling said data to be written into said memory when the monitored voltage is insufficient for writing said transmission data into said memory.

10. The system as set forth in claim 1, wherein said transponder comprises a memory in which transmission data from said interrogator is written and from which said transponder reads said answer data in accordance with a READ instruction included in said transmission data; and wherein said interrogator comprises control means which, in response to a WRITE instruction, provides to said transponder a dummy instruction of not actually writing said transmission data into memory but consuming the same energy as required in writing said transmission data, in precedence to actually writing said transmission data into a specified area of said memory, a voltage monitor being included in said transponder to monitor a voltage available at said energy storing means, said voltage monitor enabling said transmission data to be written into said memory when the monitored voltage is sufficient for writing said transmission data into said memory and disabling said data to be written into said memory when the monitored voltage is insufficient for writing said transmission data into said memory.

11. The system as set forth in claim 1, wherein said transponder comprises:

a memory in which transmission data from said interrogator is written and from which said transponder reads said answer data in accordance with a READ instruction included in said transmission data;

a RAM in which transmission data from said interrogator is temporarily written, said RAM requiring substantially the same energy consumption at said energy storing means as said memory does in writing said transmission data; and a voltage monitor which monitors a voltage available at said energy storing means and initializes said RAM when the monitored voltage is insufficient for writing said transmission data into said RAM;

said interrogator comprising:

control means which, in response to a WRITE instruction, provides a first WRITE order of writing said transmission data into said RAM and a READ order of reading said data from said RAM and transmitting said data back to said interrogator; and check means which checks whether said data transmitted back from said RAM of said transponder is valid or not, and which provides to said transponder a second WRITE order of writing said transmission data into said memory when said data from said RAM is valid.

12. The system as set forth in claim 1, wherein each of said first and second series of binary digits has only one binary digit "0", and in said coded signal each "0" is separated from another by at least one "1".

* * * * *

UNITED STATES PATENT AND TRADEMARK OFFICE
CERTIFICATE OF CORRECTION

PATENT NO. : 5,712,630

DATED : January 27, 1998

INVENTOR(S) : Nanboku et al.

It is certified that error appears in the above-identified patent and that said Letters Patent is hereby corrected as shown below:

TITLE PAGE:

Item [75], line 3, delete "Kirakata" insert therefor -- Hirakata --

Signed and Sealed this

Twelfth Day of May, 1998

Attest:

Attesting Officer

BRUCE LEHMAN

Commissioner of Patents and Trademarks